US012477497B2

(12) United States Patent
Chandramouli et al.

(10) Patent No.: US 12,477,497 B2
(45) Date of Patent: Nov. 18, 2025

(54) CONCURRENT SERVICES OF NON-PUBLIC AND PUBLIC NETWORKS

(71) Applicant: NOKIA TECHNOLOGIES OY, Espoo (FI)

(72) Inventors: Devaki Chandramouli, Dallas, TX (US); Faranaz Sabouri-Sichani, Aalborg (DK); Frank Frederiksen, Klarup (DK); Nuno Kiilerich Pratas, Gistrup (DK); Laura Luque Sanchez, Nibe (DK); Jakob Buthler, Aalborg (DK)

(73) Assignee: Nokia Technologies Oy, Espoo (FI)

( * ) Notice: Subject to any disclaimer, the term of this patent is extended or adjusted under 35 U.S.C. 154(b) by 405 days.

(21) Appl. No.: 17/924,967

(22) PCT Filed: May 12, 2020

(86) PCT No.: PCT/EP2020/063238
§ 371 (c)(1),
(2) Date: Nov. 11, 2022

(87) PCT Pub. No.: WO2021/228375
PCT Pub. Date: Nov. 18, 2021

(65) Prior Publication Data
US 2023/0199549 A1 Jun. 22, 2023

(51) Int. Cl.
*H04W 60/00* (2009.01)
*H04W 36/14* (2009.01)

(52) U.S. Cl.
CPC ........... *H04W 60/00* (2013.01); *H04W 36/14* (2013.01)

(58) Field of Classification Search
None
See application file for complete search history.

(56) References Cited

U.S. PATENT DOCUMENTS

| 2014/0228034 | A1* | 8/2014 | Gao | H04W 36/142 |
| | | | | 455/437 |
| 2018/0192441 | A1* | 7/2018 | Yang | H04W 16/14 |
| 2020/0314701 | A1* | 10/2020 | Talebi Fard | H04W 36/08 |
| 2020/0351804 | A1* | 11/2020 | Moon | H04W 56/001 |
| 2020/0359395 | A1* | 11/2020 | Lohmar | H04W 28/0268 |
| 2021/0152598 | A1* | 5/2021 | Kapelevich | H04L 63/0281 |
| 2021/0194988 | A1* | 6/2021 | Chaysinh | H04L 41/5025 |
| 2021/0266806 | A1* | 8/2021 | Gustafsson | H04W 36/0085 |
| 2021/0392605 | A1* | 12/2021 | Park | H04W 60/005 |
| 2022/0210757 | A1* | 6/2022 | Hong | H04W 60/005 |

FOREIGN PATENT DOCUMENTS

WO 2020/005127 A1 1/2020

OTHER PUBLICATIONS

Futurewei, "K2 #2 update for VIAPA: Assumptions and further clarifications", Jan. 13-17, 2020, 3GPP, S2-2001526, pp. 1-5.*

(Continued)

*Primary Examiner* — Adnan Baig
(74) *Attorney, Agent, or Firm* — Barta Jones, PLLC

(57) ABSTRACT

Methods of providing service continuity with respect to a service of a first network for a user equipment and a service of a second network for the user equipment, as well as a user equipment and networks being adapted to be operated according to the methods are disclosed.

9 Claims, 7 Drawing Sheets

(56) References Cited

OTHER PUBLICATIONS

International Search Report and Written Opinion dated Jan. 26, 2021 corresponding to International Patent Application No. PCT/EP2020/063238.
3GPP TS 24.501 V16.4.1 (Mar. 2020), Technical Specification, 3rd Generation Partnership Project; Technical Specification Group Core Network and Terminals; Non-Access-Stratum (NAS) protocol for 5G System (5GS); Stage 3; (Release 16), Mar. 2020.
3GPP TR 21.905 V16.0.0 (Jun. 2019), Technical Report, 3rd Generation Partnership Project; Technical Specification Group Services and System Aspects; Vocabulary for 3GPP Specifications (Release 16), Jun. 2019.
3GPP TS 22.261 V17.2.0 (Mar. 2020), Technical Specification, 3rd Generation Partnership Project; Technical Specification Group Services and System Aspects; Service requirements for the 5G system; Stage 1 (Release 17), Mar. 2020.
3GPP TS 22.263 V17.0.0 (Dec. 2019), Technical Specification, 3rd Generation Partnership Project; Technical Specification Group Technical Specification Group Services and System Aspects; Service requirements for video, imaging and audio for professional applications (VIAPA); Stage 1 (Release 17), Dec. 2019.
3GPP TS 23.122 V16.5.0 (Mar. 2020), Technical Specification, 3rd Generation Partnership Project; Technical Specification Group Core Network and Terminals; Non-Access-Stratum (NAS) functions related to Mobile Station (MS) in idle mode (Release 16), Mar. 2020.
3GPP TS 23.501 V16.4.0 (Mar. 2020), Technical Specification, 3rd Generation Partnership Project; Technical Specification Group Services and System Aspects; System architecture for the 5G System (5GS); Stage 2 (Release 16), Mar. 2020.
3GPP TS 23.502 V16.4.0 (Mar. 2020), Technical Specification, 3rd Generation Partnership Project; Technical Specification Group Services and System Aspects; Procedures for the 5G System (5GS); Stage 2 (Release 16), Mar. 2020.
3GPP TS 33.501 V16.2.0 (Mar. 2020), Technical Specification, 3rd Generation Partnership Project; Technical Specification Group Services and System Aspects; Security architecture and procedures for 5G system (Release 16), Mar. 2020.
Nokia et al., "Network and cell (re)selection in SNPN access mode," 3GPP Draft; R2-1915384, 3GPP TSG-RAN WG2 Meeting #108, Reno, USA, Nov. 18-22, 2019, Nov. 8, 2019, XP051817185.
Futurewei et al., "KI #2 update for VIAPA: Assumptions and further clarifications," S2-2001526, 3GPP SA WG2 Meeting #136AH, Jan. 13-17, 2020, Incheon, Korea, Jan. 17, 2020, XP051844263.
3GPP TS 32.700: "Technical Specification Group Services and System Aspects; Study on enhanced support of non-public networks."

\* cited by examiner

CONCURRENT SERVICES OF NON-PUBLIC AND PUBLIC NETWORKS

FIELD

The subject-matter described herein generally relates to cellular systems and more particularly, to cellular systems including 5G networks. Yet more particularly, the subject-matter described herein relates to concurrent services of non-public and public networks.

BACKGROUND

The background is explained with reference to 3GPP 5G, but just for illustration and not being limited thereto. Rather, the questions arising from the 5G background can be also found in other communication environments with concurrent services from different networks or network parts.

As regards 5G, reference is made to the following 3GPP documents, the disclosure of which being incorporated by reference and/or represents knowledge of the skilled person:
- 3GPP TR 21.905: "Vocabulary for 3GPP Specifications"
- 3GPP TS 22.261: "Service requirements for next generation new services and markets"
- 3GPP TS 22.263: "Service requirements for Video, Imaging and Audio for Professional Applications (VIAPA)"
- 3GPP TS 23.501: "System Architecture for the 5G System; Stage 2"
- 3GPP TS 23.122: "Non-Access-Stratum (NAS) functions related to Mobile Station in idle mode"
- 3GPP TS 23.502: "Procedures for the 5G System; Stage 2"
- 3GPP TS 32.700: "Technical Specification Group Services and System Aspects; Study on enhanced support of non-public networks"
- 3GPP TS 33.501: "Security architecture and procedures for 5G system"

Further, the architectural principles according to 3GPP document TS 23.501 may be used as basis, according to which a user equipment UE may obtain services concurrently from a non-public network NPN and a public networks PN (also often referred to a PLMN) having overlapping radio coverage areas with respect to the UE. A NPN may be a Standalone NPN (SNPN) or a Public Network Integrated NPN (PNI-NPN).

To obtain services from both the NPN and the PN, the UE has subscription with both, i.e. can register with both networks. Assume that the UE is currently receiving a service from the NPN; to this end, the UE may camp in the NPN. Then, as a problem, it is not possible for the UE to access a service from the PN and/or being paged by the PN. As further problem can been seen in that, the other way round, the PN cannot provide its service to the UE, as the UE as long it is being serviced by the NPN. These two latter scenarios are of particular interest in cases where at least one of the NPN service and the PN service require low latency and/or high data rates.

SUMMARY

To solve the above problems, the present disclosure provides subject-matter according to independent claims, modifications and variations thereof being defined in dependent claims.

In some aspects, there is provided a method of providing concurrent services from a first network and a second network for a user equipment, the method comprising the steps of registering the user equipment with the second network, camping the UE in the second network,
registering the user equipment with the first network,
transmitting a priority indicating message from the first network to the second network, the priority indicating message indicating a priority of the service offered by the first network,
providing the service of the second network to the user equipment,
switching, according to the priority indicating message from the first network, from providing the service of the second network to the user equipment to providing the service from the first network to the user equipment,
providing the service from the first network to the user equipment via the second network.

In the above method, the user equipment may be registered with the second network via an access node of the second network, with the first network via the access node of the second network, wherein the service of the first network may be provided to the user equipment via the second network.

In the above method, the priority indicating message from first network may comprise a priority request message to the second network to grant priority for service from the public-network.

In the above method, the second network may transmit priority information to the user equipment to indicate towards the UE that service related messaging from the first network has priority.

In the above method, the priority indicating message from first network may comprise a priority notification message to the user equipment, wherein the priority notification message may be delivered, upon initiation by first network, via the second network, wherein the priority notification message may instruct the user equipment to listen to service related messaging information from the first network during provision of the service from the second network.

In the above method, the priority notification message may indicate that the service of the first network has priority over the service from the second network.

In the above method, the priority notification message from the first network may include allocation and retention priority information.

In the above method, the priority indicating message from the first network may indicate a traffic pattern according to which the service of the first network is provided.

In the above method, the second network may reserves, according to the traffic pattern provided by the first network, resources including at least one time slot for the service of the second network and resources including at least one time slot for the service of the first network, wherein the service of the second network may be provided during the at least one time slot reserved for the service of the second network and the service of the first network may be provide during the at least one time slot reserved for the service of the first network.

In the above method, the second network may switch, according to the traffic pattern provided by the first network, from multicast for providing the service of the second network to unicast for providing the service of the first network, or from unicast for providing the service of the second network to multicast for providing the service of the first network.

The above method may comprise at least one of pausing the provision of the service of the second network according to the traffic pattern during provision of the service of the first network, and buffering the service of the second network according to the traffic pattern during provision of the service of the first network.

In the above method, the first network may be a public network and the second network may be a non-public network, or the first network may be a non-public network and the second network may be a public network.

In further aspects, there is provided a user equipment as defined in the claims.

In further aspects, there is also provided a user equipment being adapted to obtain a service from a first network and a service from a second network, the user equipment comprising
 means to register with the second network,
 means to camp in the second network,
 means to register with the first network,
 means to obtain the service of the second network, wherein
 means to switch, according to a priority indicating message from the first network, from obtaining the service of the second network to obtaining the service of the first network, the priority indicating message indicating a priority of the service offered by the first network over the service of the second network.

In further aspects, there is provided a user equipment being adapted to obtain a service from a first network and a service from a second network, the user equipment comprising
 at least one processor,
 at least one memory including computer program code,
 the at least one memory and the computer program code being configured to, with the at least one processor, cause the user equipment at least to perform:
 registering with the second network,
 camping in the second network,
 registering with the first network,
 obtaining the service of the second network, wherein
 switching, according to a priority indicating message from the first network, from obtaining the service of the second network to obtaining the service of the first network, the priority indicating message indicating a priority of the service offered by the first network over the service of the second network.

The user equipment may register with the second network via an access node of the second network, with the first network via the access node of the second network and the second network, wherein the service of the first network is provided via the second network.

With respect to the user equipment, the priority indicating message from first network may comprise a priority request message to the second network to grant priority for service from the public-network.

With respect to the user equipment, the second network may transmit priority information to the user equipment to indicate towards the UE that service related messaging from the first network has priority.

With respect to the user equipment, the priority indication message may comprise a priority notification message to the user equipment, wherein the priority notification message may be delivered, upon initiation by first network, via second network, the priority notification message instructing the user equipment to listen to service related messaging information from the first network during provision of the service from the second network.

The user equipment may be adapted to in response to the priority notification message from the first network indicating that the service from the first network is to be provided, switch to receive the service from the first network.

With respect to the user equipment, the priority notification message may indicate that the service of the first network has priority over the service from the non-public.

With respect to the user equipment, the notification message from the first network may include allocation and retention priority information.

With respect to the user equipment, the priority indicating message from the first network may indicate a traffic pattern according to which the service of the first network is provided.

The user equipment may be adapted to obtain the service of the second network during at least one time slot previously reserved by the second network, according to the traffic pattern, for the service of the second network, to obtain the service of the first network during at least one time slot previously reserved by the second network, according to the traffic pattern, for the service of the first network.

With respect to the user equipment, the first network may be a public network and the second network may be a non-public network, or the first network may be a non-public network and the second network may be a public network.

In further aspects, there is provided a network for providing a service to a user equipment being adapted to register with a second network being adapted to provide a service to the user equipment via the network as defined in the claims.

In further aspects, there is provided a network being adapted to provide a service to a user equipment being adapted to register with a second network being adapted to provide a service to the user equipment via the network, the network comprising
 means to register the user equipment with the network,
 means to receive a priority indicating message from the second network, the priority indicating message indicating a priority of the service offered by the second network over the service of the network,
 means to provide the service of the network to the user equipment,
 means to switch, according to the priority indicating message from the second network, from providing the service from the network to the user equipment to providing the service from the second network to the user equipment,
 means to provide the service from the second network to the user equipment.

In further aspects, there is provided a network for providing a service to a user equipment being adapted to register with a second network being adapted to provide a service to the user equipment via the network, the network comprising
 at least one processor,
 at least one memory including computer program code,
 the at least one memory and the computer program code being configured to, with the at least one processor, cause the further network at least to perform:
 registering the user equipment with the network,
 receiving a priority indicating message from the second network, the priority indicating message indicating a priority of the service offered by the second network over the service of the network, provide the service of the network to the user equipment,
 switching, according to the priority indicating message from the second network, from providing the service from the network to the user equipment to providing the service from the second network to the user equipment,
providing the service from the second network to the user equipment.

The network may comprise an access node via which the user equipment is registered with the network, wherein the user equipment may be registered with the second network via the access node of the network and the network.

With respect to the network, the priority indicating message from second network may comprise a priority request message to the network to grant priority for service from the public-network.

With respect to the network, the network may transmit priority information to the user equipment to indicate towards the UE that service related messaging from the second network has priority.

With respect to the network, the priority indicating message from second network may comprise a priority notification message delivered, upon initiation by second network, via the network to the user equipment, the priority notification message instructing the user equipment to listen to service related messaging information from the second network during provision of the service from the network.

With respect to the network, the priority notification message from the second network may include allocation and retention priority information.

With respect to the network, the priority indicating message from second network may indicate a traffic pattern according to which the service of the second network is provided.

The network may be adapted to reserve resources including at least one time slot for the service of the network and resources including at least one time slot for the service of the second network according to the traffic pattern, to provide the service of the network during the at least one time slot for the service of the network, to provide the service of the second network during the at least one time slot for the service of the second network.

The network may be adapted to at least one of pause the provision of the service of the network according to the traffic pattern during provision of the service from the second network, buffering the service of the network according to the traffic pattern during provision of the service from the second network.

The network may be adapted to switch, according to the traffic pattern provided by the first network, from multicast for providing the service of the second network to unicast for providing the service of the first network, or from unicast for providing the service of the second network to multicast for providing the service of the first network.

The network may be a non-public network and the second network may be a public network, or the network may be a public network and the second network may be a non-public network.

In further aspects, there is provided further network adapted to provide a service to a user equipment being registered with a second network being adapted to provide a service to the user equipment as defined in the claims.

In further aspects, there is provided a further network adapted to provide a service to a user equipment being registered with a second network being adapted to provide a service to the user equipment, the further network comprising
means to register the user equipment with the network,
means to transmit a priority indicating message from the network to the second network, the priority indicating message indicating a priority of the service of the network over the service of the second network,
means to provide the service of the network to the user equipment via the second network according to the priority indicating message.

In further aspects, there is provided a further network for providing a service to a user equipment being registered with a second network being adapted to provide a service to the user equipment, the further network comprising
at least one processor,
at least one memory including computer program code,
the at least one memory and the computer program code being configured to, with the at least one processor, cause the further network at least to perform:
registering the user equipment with the network,
transmitting a priority indicating message from the network to the second network, the priority indicating message indicating a priority of the service of the network over the service of the second network,
providing the service of the network to the user equipment via the second network according to the priority indicating message.

With respect to the further network, user equipment may be registered with the second network via an access node of the network, with the network via the access node of the network and the second network.

With respect to the further network, the priority indicating message from network may comprise a priority request message to the second network to grant priority for service from the public-network.

With respect to the further network, the second network may transmit priority information to the user equipment to indicate towards the UE that service related messaging from the network has priority.

With respect to the further network, the priority indicating message from network may comprise a priority notification message to the user equipment, wherein the priority notification message is delivered, upon initiation by network, via the second network, the priority notification message instructing the user equipment to listen to service related messaging information from the network during provision of the service from the second network.

With respect to the further network, the priority notification message may indicate that the service of the network has priority over the service from the second network.

With respect to the further network, the priority notification message from the network may include allocation and retention priority information.

With respect to the further network, the priority indicating message from network may indicate a traffic pattern according to which the service of the network is provided.

The further network may be adapted to provide the service of the network in at least one time slot previously reserved by the second network, according to the traffic pattern, for the service of the network.

The further the network may be a public network and the second network may be a non-public network, or the network may be a non-public network and the second network may be a public network.

In further aspects, there is provided a system comprising a network as set forth above and a further network as set forth above.

The system may further comprise a user equipment as set forth above.

In further aspects, there is provided a computer program product comprising program instructions stored on a computer readable medium to execute the steps of a method as set forth above when said program is executed on a computer.

In further aspects, there is provided a non-transitory computer readable medium comprising program instructions for causing an apparatus to perform the steps of a method as set forth above.

BRIEF DESCRIPTION OF THE DRAWINGS

A better understanding of the subject-matter described herein can be obtained when the following detailed description of various variations is considered in conjunction with the following drawings, in which.

DETAILED DESCRIPTION

Figure 1:
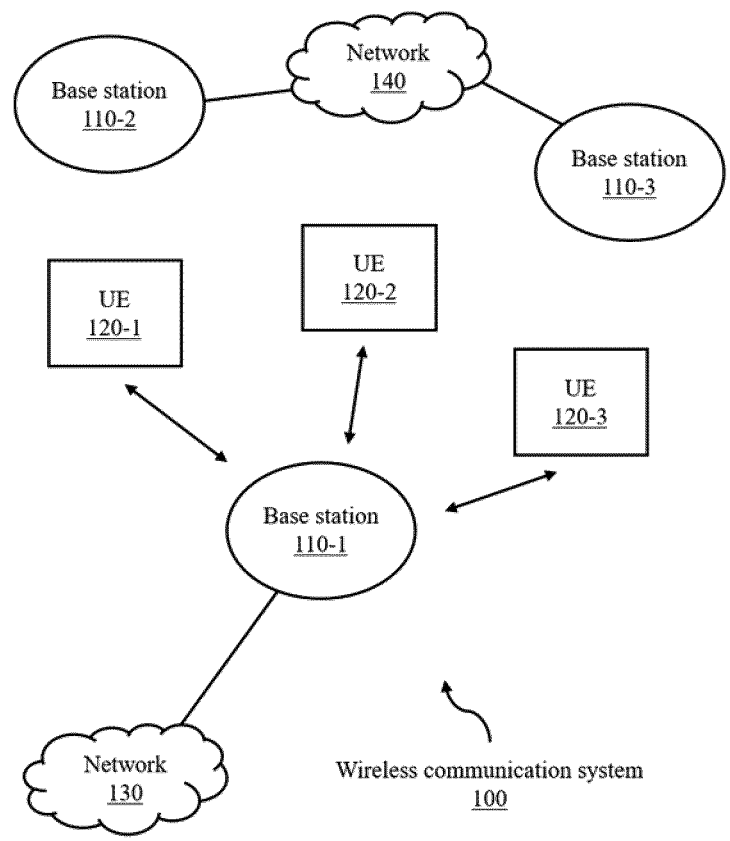
FIG. 1 illustrates a simplified wireless communication system according to some variations.

FIG. 1 illustrates a simplified wireless communication system 100, according to some variations. It is noted that the system of FIG. 1 is merely one example of a possible system, and that features of the subject-matter described herein may be implemented in any of various systems, as desired.

As shown, the wireless communication system 100 includes a base station 110-1, which communicates over a transmission medium with one or more user devices 120. In FIG. 1, only three user devices 120-1, 120-2, and 120-3 are shown, without limitation. Each of the user devices 120-1, 120-2, and 120-3 may be referred to herein as a "user equipment" (UE). Thus, the user devices 120 are referred to as UEs or UE devices.

As used herein, the term "user equipment" may refer to any of various types of computer systems devices which are mobile or portable and which perform wireless communications. Examples of UEs include mobile telephones or smart phones, portable gaming devices, laptops, wearable devices (e.g., smart watch, smart glasses), Personal Digital Assistants (PDAs), portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

The base station (BS) 110-1 may be a base transceiver station (BTS) or cell site (a "cellular base station"), and may include hardware that enables wireless communication with the UEs 120.

As used herein, the term "base station" has the full breadth of its ordinary meaning, and at least includes a wireless communication station installed at a fixed location and used to communicate as part of a wireless telephone system or radio system.

The communication area (or coverage area) of the base station 110 may be referred to as a "cell." The base station 110 and the UEs 120 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. If the base station 110-1 is implemented in the context of LTE, it may alternately be referred to as an "eNodeB" or "eNB". If the base station 110-1 is implemented in the context of 5G NR, it may alternately be referred to as "gNodeB" or "gNB".

As shown, the base station 110-1 may also be equipped to communicate with a network 130 (e.g., a core network of a cellular service provider, a telecommunication network such as a public switched telephone network (PSTN), and/or the Internet, among various possibilities). Thus, the base station 110-1 may facilitate communication between the user devices 120 and/or between the user devices 120 and the network 130. In particular, the cellular base station 110-1 may provide UEs 120 with various telecommunication capabilities, such as voice, SMS and/or data services.

The base station 110-1 and other similar base stations (such as base stations 110-2 and 110-3) operating according to the same or a different cellular communication standard may thus be provided as a network of cells, which may provide continuous or nearly continuous overlapping service to UEs 120 and similar devices over a geographic area via one or more cellular communication standards.

Other base station(s), e.g. base station 110-1 and/or base station 110-3, may also be equipped to communicate with a network 140 (e.g., a core network of a cellular service provider, a telecommunication network such as a public switched telephone network (PSTN), and/or the Internet, among various possibilities). Hence, the other base station(s) may facilitate communication between the user devices 120 and/or between the user devices 120 and the network 140, for example to provide UEs 120 with various telecommunication capabilities, such as voice, SMS and/or data services.

Networks with which the base stations may communicate may be part of a common overall network or communication system, or belong to different communication systems or environments.

Thus, while base station 110-1 may act as a "serving cell" for UEs 120 as illustrated in FIG. 1, each UE 120 may also be capable of receiving signals from (and possibly within communication range of) one or more other cells (which might be provided by base stations 110 and/or any other base stations), which may be referred to as "neighboring cells". Such cells may also be capable of facilitating communication between user devices 120 and/or between user devices 120 and the network 130. Such cells may include "macro" cells, "micro" cells, "pico" cells, and/or cells, which provide any of various other granularities of service area size. For example, base stations 110-1 and 110-2 illustrated in FIG. 1 might be macro cells, while base station 110-3 might be a micro cell. Other configurations are also possible.

In some variations, base station 110-1 may be a next generation base station, e.g., a 5G New Radio (5G NR) base station, or "gNB". In some variations, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

The UE 120 may be capable of communicating using multiple wireless communication standards. For example, the UE 120 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1xRTT, 1xEV-DO, HRPD, eHRPD), etc.). The UE 120 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

Figure 2:
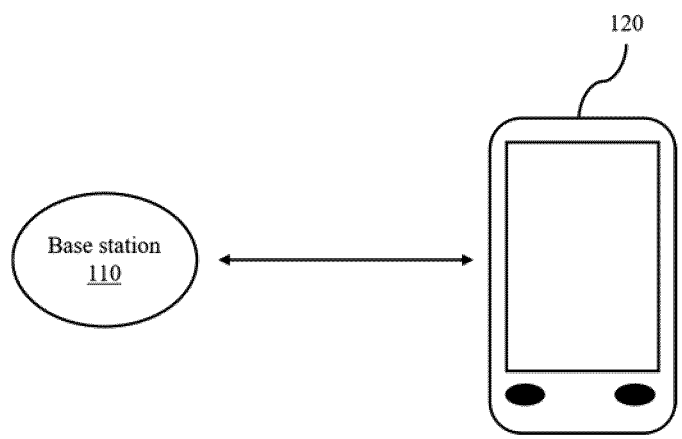
FIG. 2 illustrates a base station (BS) in communication with a user equipment (UE) according to some variations.

FIG. 2 illustrates user equipment 120 (e.g., one of the devices 120-1, 120-2 and 120-3) in communication with a base station 110, according to some variations. The UE 120 may be a device with cellular communication capability such as a mobile phone, a hand-held device, a computer or a tablet, or virtually any type of wireless device.

The UE 120 may include a processor that is configured to execute program instructions stored in memory. The UE 120 may perform any of the method variations described herein by executing such stored instructions. Alternatively, or in addition, the UE 120 may include a programmable hardware element such as a field-programmable gate array (FPGA) that is configured to perform any of the method variations described herein, or any portion of any of the method variations described herein.

The UE 120 may include one or more antennas for communicating using one or more wireless communication protocols or technologies. In some variations, the UE 120 may be configured to communicate using, for example, CDMA2000 (1xRTT/1xEV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 120 may share one or more parts of a receive and/or transmit chain between multiple wireless communication technologies, such as those discussed above.

In some variations, the UE 120 may include separate transmit and/or receive chains (e.g., including separate antennas and other radio components) for each wireless communication protocol with which it is configured to communicate. As a further possibility, the UE 120 may include one or more radios, which are shared between multiple wireless communication protocols, and one or more radios, which are used exclusively by a single wireless communication protocol. For example, the UE 120 might include a shared radio for communicating using either of LTE or 5G NR (or LTE or 1xRTT or LTE or GSM), and separate radios for communicating using each of Wi-Fi and Bluetooth™. Other configurations are also possible.

Figure 3:
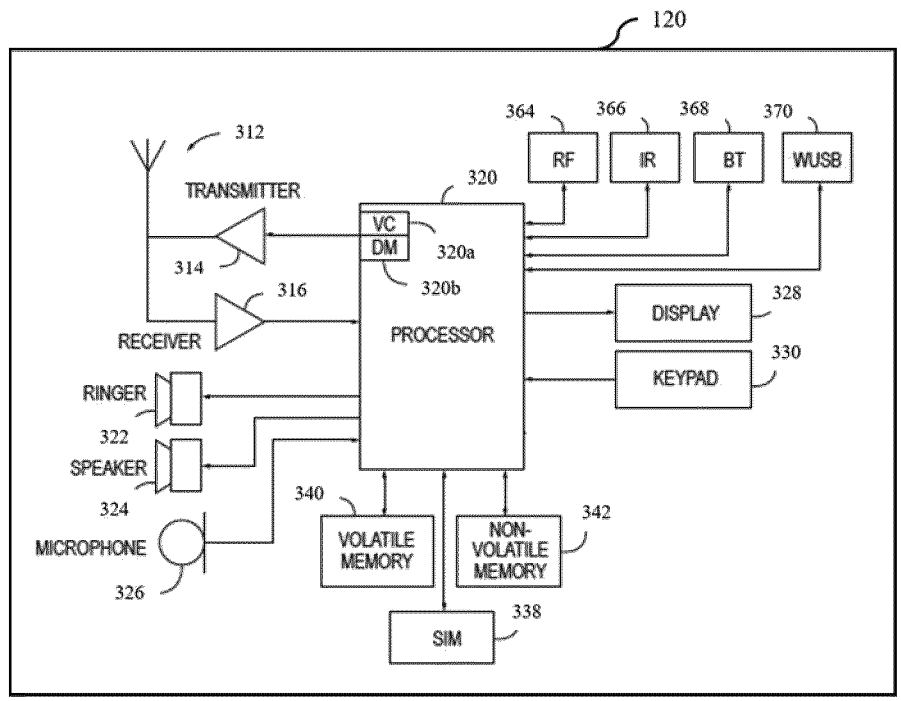
FIG. 3 illustrates a simplified block diagram of a UE according to some variations.

FIG. 3 illustrates a simplified block diagram of a UE 120, according to some variations. It is noted that the block diagram of the UE 120 of FIG. 3 is only one example of a possible user device. According to variations, UE 120 may be a user device, a mobile device or mobile station, a wireless device or wireless station, a desktop computer or computing device, a mobile computing device (e.g., a laptop, notebook, or portable computing device), a tablet and/or a combination of devices, among other devices.

As shown, the UE 120 may include a set of components configured to perform core functions. For example, this set of components may be implemented as a system on chip (SOC), which may include portions for various purposes. Alternatively, this set of components may be implemented as separate components or groups of components for the various purposes. The set of components may be coupled (e.g., communicatively; directly or indirectly) to various other circuits of the UE 120.

The UE 120 may include at least one antenna 312 in communication with a transmitter 314 and a receiver 316. Alternatively, transmit and receive antennas may be separate. The UE 120 may also include a processor 320 configured to provide signals to and receive signals from the transmitter 314 and receiver 316, respectively, and to control the functioning of the UE 120. Processor 320 may be configured to control the functioning of the transmitter 314 and receiver 316 by effecting control signaling via electrical leads to the transmitter 314 and receiver 316. Likewise, the processor 320 may be configured to control other elements of the UE 120 by effecting control signaling via electrical leads connecting processor 320 to the other elements, such as a display or a memory. The processor 320 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Accordingly, although illustrated in FIG. 3 as a single processor, in some example variations the processor 320 may comprise a plurality of processors or processing cores.

The UE 120 may be capable of operating with one or more air interface standards, communication protocols, modulation types, access types, and/or the like. Signals sent and received by the processor 320 may include signaling information in accordance with an air interface standard of an applicable cellular system, and/or any number of different wireline or wireless networking techniques, comprising but not limited to Wi-Fi, wireless local access network (WLAN) techniques, such as Institute of Electrical and Electronics Engineers (IEEE) 802.11, 802.16, 802.3, ADSL, DOCSIS, and/or the like. In addition, these signals may include speech data, user generated data, user requested data, and/or the like.

For example, the UE 120 and/or a cellular modem therein may be capable of operating in accordance with various first generation (1G) communication protocols, second generation (2G or 2.5G) communication protocols, third-generation (3G) communication protocols, fourth-generation (4G) communication protocols, fifth-generation (5G) communication protocols, Internet Protocol Multimedia Subsystem (IMS) communication protocols (for example, session initiation protocol (SIP) and/or the like. For example, the UE 120 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the UE 120 may be capable of operating in accordance with 2.5G wireless communication protocols General Packet Radio Service (GPRS), Enhanced Data GSM Environment (EDGE), and/or the like. Further, for example, the UE 120 may be capable of operating in accordance with 3G wireless communication protocols, such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The UE 120 may be additionally capable of operating in accordance with 3.9G wireless communication protocols, such as Long Term Evolution (LTE), Evolved Universal Terrestrial Radio Access Network (EUTRAN), and/or the like. Additionally, for example, the UE 120 may be capable of operating in accordance with 4G wireless communication protocols, such as LTE Advanced, 5G, and/or the like as well as similar wireless communication protocols that may be subsequently developed.

It is understood that the processor 320 may include circuitry for implementing audio/video and logic functions of the UE 120. For example, the processor 320 may comprise a digital signal processor device, a microprocessor device, an analog-to-digital converter, a digital-to-analog converter, and/or the like. Control and signal processing functions of the UE 120 may be allocated between these devices according to their respective capabilities. The processor 320 may additionally comprise an internal voice coder (VC) 320a, an internal data modem (DM) 320b, and/or the like. Further, the processor 320 may include functionality to operate one or more software programs, which may be stored in memory. In general, the processor 320 and stored software instructions may be configured to cause the UE 120 to perform actions. For example, the processor 320 may be capable of operating a connectivity program, such as a web browser. The connectivity program may allow the UE 120 to transmit and receive web content, such as location-based content, according to a protocol, such as wireless application protocol (WAP), hypertext transfer protocol (HTTP), and/or the like.

The UE 120 may also comprise a user interface including, for example, an earphone or speaker 324, a ringer 322, a microphone 326, a display 328, a user input interface, and/or the like, which may be operationally coupled to the processor 320. The display 328 may, as noted above, include a touch sensitive display, where a user may touch and/or gesture to make selections, enter values, and/or the like. The processor 320 may also include user interface circuitry configured to control at least some functions of one or more elements of the user interface, such as the speaker 324, the ringer 322, the microphone 326, the display 328, and/or the like. The processor 320 and/or user interface circuitry comprising the processor 320 may be configured to control one or more functions of one or more elements of the user interface through computer program instructions, for example, software and/or firmware, stored on a memory accessible to the processor 320, for example, volatile memory 340, non-volatile memory 342, and/or the like. The UE 120 may include a battery for powering various circuits related to the mobile terminal, for example, a circuit to provide mechanical vibration as a detectable output. The user input interface may comprise devices allowing the UE 120 to receive data, such as a keypad 330 (which can be a virtual keyboard presented on display 328 or an externally coupled keyboard) and/or other input devices.

As shown in FIG. 3, the UE 120 may also include one or more mechanisms for sharing and/or obtaining data. For example, UE 120 may include a short-range radio frequency (RF) transceiver and/or interrogator 364, so data may be shared with and/or obtained from electronic devices in accordance with RF techniques. The UE 120 may include other short-range transceivers, such as an infrared (IR) transceiver 366, a Bluetooth™ (BT) transceiver 368 operating using Bluetooth™ wireless technology, a wireless universal serial bus (USB) transceiver 370, a Bluetooth™ Low Energy transceiver, a ZigBee transceiver, an ANT transceiver, a cellular device-to-device transceiver, a wireless local area link transceiver, and/or any other short-range radio technology. The UE 120 and, in particular, the short-range transceiver may be capable of transmitting data to and/or receiving data from electronic devices within the proximity of the apparatus, such as within 10 meters, for example. The UE 120 including the Wi-Fi or wireless local area networking modem may also be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The UE 120 may comprise memory, such as a subscriber identity module (SIM) 338, a removable user identity module (R-UIM), an eUICC, an UICC, and/or the like, which may store information elements related to a mobile subscriber. In addition to the SIM, the UE 120 may include other removable and/or fixed memory. The UE 120 may include volatile memory 340 and/or non-volatile memory 342. For example, the volatile memory 340 may include Random Access Memory (RAM) including dynamic and/or static RAM, on-chip or off-chip cache memory, and/or the like. The non-volatile memory 342, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory 340, the non-volatile memory 342 may include a cache area for temporary storage of data. At least part of the volatile and/or non-volatile memory may be embedded in the processor 320. The memories may store one or more software programs, instructions, pieces of information, data, and/or the like which may be used by the apparatus for performing operations disclosed herein.

The memories may comprise an identifier, such as an International Mobile Equipment Identification (IMEI) code, capable of uniquely identifying the UE 120. The memories may comprise an identifier, such as an international mobile equipment identification (IMEI) code, capable of uniquely identifying the UE 120. In the example variation, the processor 320 may be configured using computer code stored at memory 340 and/or 342 to cause the processor 320 to perform operations disclosed herein.

Some of the variations disclosed herein may be implemented in software, hardware, application logic, or a combination of software, hardware, and application logic. The software, application logic, and/or hardware may reside on the memory 340, the processor 320, or electronic components, for example. In some example variation, the application logic, software or an instruction set is maintained on any one of various conventional computer-readable media. In the context of this document, a "computer-readable medium" may be any non-transitory media that can contain, store, communicate, propagate or transport the instructions for use by or in connection with an instruction execution system, apparatus, or device, such as a computer or data processor circuitry, with examples depicted at FIG. 3, computer-readable medium may comprise a non-transitory computer-readable storage medium that may be any media that can contain or store the instructions for use by or in connection with an instruction execution system, apparatus, or device, such as a computer.

Figure 4:
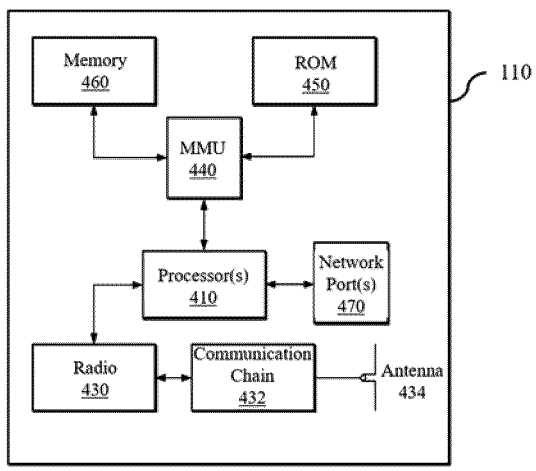
FIG. 4 illustrates a simplified block diagram of a BS according to some variations.

FIG. 4 illustrates a simplified block diagram of a base station 110, according to some variations. It is noted that the base station 110 of FIG. 4 is merely one example of a possible base station. As shown, the base station 110 may include processor(s) 410, which may execute program instructions for the base station 110. The processor(s) 410 may also be coupled to memory management unit (MMU) 440, which may be configured to receive addresses from the processor(s) 410 and translate those addresses to locations in memory (e.g., memory 460 and read only memory (ROM) 450) or to other circuits or devices.

The base station 110 may include at least one network port 470. The network port 470 may be configured to couple to a telephone network and provide a plurality of devices, such as UE 120, access to the wireless communication network 100 as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE 120. In some cases, the network port 470 may couple to a telephone network via the core network, and/or the core network may provide a telephone network (e.g., among other UE serviced by the cellular service provider).

In some variations, the base station 110 may be a next generation base station, e.g., a 5G New Radio (5G NR) base station, or "gNB". In such variations, the base station 110 may be connected to a legacy evolved packet core (EPC) network and/or to a NR core (NRC) network. In addition, the base station 110 may be considered as 5G NR cell and may include one or more transition and reception points (TRPs). In addition, a UE capable of operating according to 5G NR may be connected to one or more TRPs within one or more gNBs.

The base station 110 may include at least one antenna 434, and possibly multiple antennas. The at least one antenna 434 may be configured to operate as a wireless transceiver and may be further configured to communicate with UE 120 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 110 may be configured to communicate wirelessly using multiple wireless communication standards. In some instances, the base station 110 may include multiple radios, which may enable the base station 110 to communicate according to multiple wireless communication technologies. For example, as one possibility, the base station 110 may include an LTE radio for performing communication according to LTE as well as a 5G NR radio for performing communication according to 5G NR. In such a case, the base station 110 may be capable of operating as both an LTE base station and a 5G NR base station. As another possibility, the base station 110 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 110 may include hardware and software components for implementing or supporting implementation of features described herein. The processor 410 of the base station 110 may be configured to implement or support implementation of part or all of the methods described herein, e.g., by executing program instructions stored on a memory medium (e.g., a non-transitory computer-readable memory medium). Alternatively, the processor 410 may be configured as a programmable hardware element, such as an FPGA (Field Programmable Gate Array), or as an ASIC (Application Specific Integrated Circuit), or a combination thereof. Alternatively (or in addition) the processor 410 of the BS 110, in conjunction with one or more of the other components 430, 432, 434, 440, 450, 460, 470 may be configured to implement or support implementation of part or all of the features described herein.

In addition, as described herein, processor(s) 410 may be comprised of one or more processing elements. In other words, one or more processing elements may be included in processor(s) 410. Thus, processor(s) 410 may include one or more integrated circuits (ICs) that are configured to perform the functions of processor(s) 410. In addition, each integrated circuit may include circuitry (e.g., first circuitry, second circuitry, etc.) configured to perform the functions of processor(s) 410.

Further, as described herein, radio 430 may be comprised of one or more processing elements. In other words, one or more processing elements may be included in radio 430. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Herein, the base station 110 may also be referred to as a network node and may be configured to provide a network function, such as an Access Management function or an Access and Mobility Management function (AMF) of a 5G radio access network.

Variations/Examples of the subject-matter disclosed herein are described with reference to systems, apparatus, methods and mechanisms for a UE or network (e.g., network node, AMF) in a 5G system. However, all observations made in relation to 5G are not limited thereto and are applicable to any communication system.

Examples, variations, modifications etc. of the subject-matter disclosed herein will now be described with references to the drawings. Further, it has to be noted that the description and drawings, exemplary and in not limiting manner, refer to scenarios where a service of a public network is provided via a non-public network. However, the description and drawings correspondingly apply to scenarios where a service of a non-public network is provided via a public network. That means that everywhere throughout the description and the drawings, references to a public network can be replaced by references to a non-public network and references to a non-public network can be replaced by references to a public network.

Figure 5A:
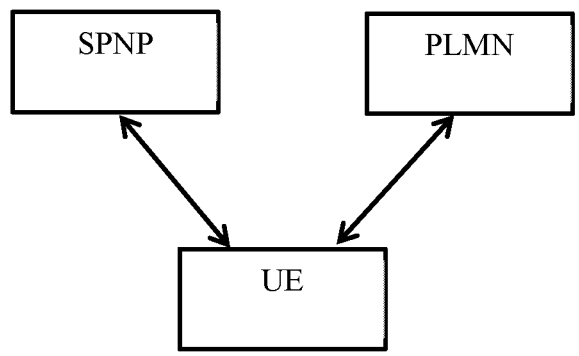
FIG. 5A illustrates a scenario with standalone NPN according to some variations.

FIG. 5A illustrates a scenario including a non-public network in form of a standalone non-public network SNPN and public network, here in form of a public mobile land network PLMN. The SNPN can be considered as network being independent of and separated from the PN. For access to SNPN, the UE can use an access node (e.g. RAN) of the SNPN or an access node shared by the SNPN and the NP. For access to PN, the UE can use an access node (e.g. RAN) of the PN or the access node shared by the SNPN and the NP. Further, the UE may access the SNPN via the access node of the NP and/or access the NP via the access node of the SNPN.

A user equipment UE has subscriptions with both the SNPN and the PN and, thus, can upon registration with the SNPN and/or the PN, obtain a service (e.g. data service) from the respective one.

Figure 5B:
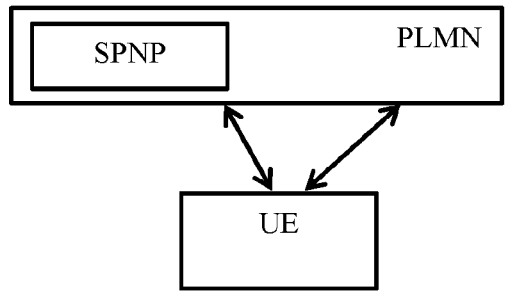
FIG. 5B illustrates a scenario with public network integrated NPN according to some variations.

FIG. 5B illustrates a scenario including a non-public network in form of a public network integrated non-public network PNI-NPN and public network in form of a public mobile land network PLMN. A PNI-NPN can be considered to be comprised by the PN and being a part with limited access to user equipment. To access the PNI-NPN, the UE has subscriptions with both the SNPN and the PN and, thus, can upon registration with the SNPN and/or the PN obtain a service (e.g. data service) from the respective one.

Access to the PNI-NPN is possible via an access node of the PN. Hence, the UE obtaining a service from the PNI-NPN can be considered as camping in the access node of the PN. However, the access node also serves a access node to the PNI-NPN and, therefore, it can be said that the UE obtaining a service from the PNI-NPN is (also) camping in the access node of the PNI-NPN.

Examples of services of the public network and/or the non-public network include at least one of, for example, data service, audio transmission, video transmission, streaming, voice communication.

A service of the public network may be provided in downlink direction to the user equipment or in uplink direction from the user equipment to the public network or bidirectional from the public network to the user equipment and vice versa.

A service of the non-public network may be provided in downlink direction to the user equipment or in uplink direction from the user equipment to the non-public network or bidirectional from the non-public network to the user equipment and vice versa.

Figure 6:
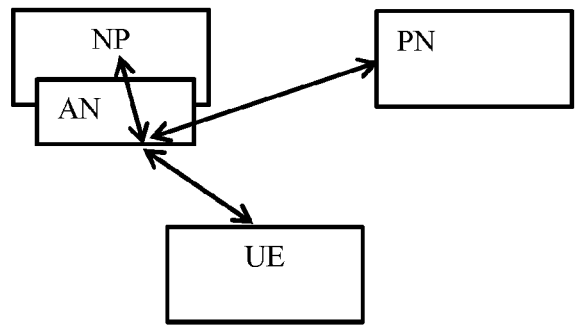
FIG. 6 illustrates NPN and PN access via an access node of the NPN according to some variations.

As a result, the illustration of FIG. 6 covers both a SNPN scenario and a PNI-NPN scenario for cases where the UE may access the public network via the access node of the non-public network. The UE is registered with both a NPN (SPNPN or PNI-NPN) and a PN (e.g. PLMN). The UE camps in the NPN or its access node AN, respectively, for obtaining a service from the NPN. A service of the PN can be accessed by the UE via the access node AN of the NPN.

Assume that the UE currently receives a service from the NPN. An illustrative example in this respect may be an NPN offering low latency and high data services for a massive number of UEs, at it might be the case at a sports event or music festival. Then, it may be possible that the PN also offers a service to one (or more) of the UEs and, to this end, tries to the page the respective UE(s). However, since the UE is camping in the NPN and its AN, respectively, the PN requires a mechanism to "get through" to and reach the UE.

In general, this is achieved by a priority indicating message that originates from the PN and indicates a priority of the service offered by the PN over the service of the non-public network.

The priority indicating message inform at least the NPN that, in the case a service of the PN is to be provided and/or the UE wishes to access a PN service, the PN service or, at least messages between the PN and the UE related to the service (e.g. paging messages) have priority over the NPN service.

Figure 7:
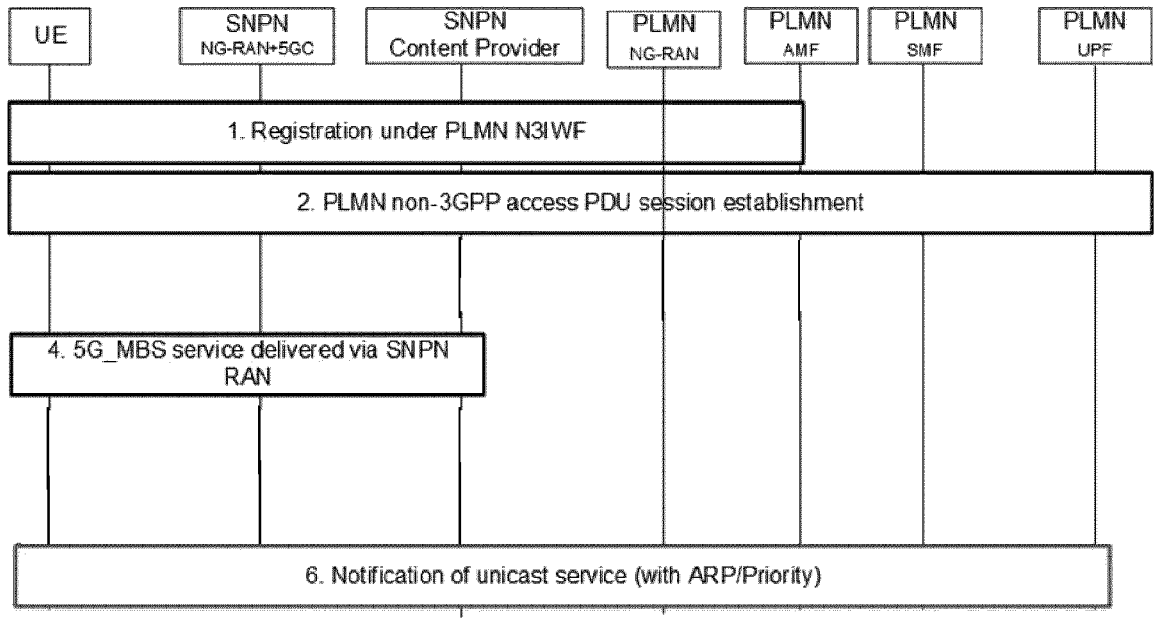
FIG. 7 illustrates a scenario using a priority notification message according to some variations.

FIG. 7 illustrates a variation where the PN uses a priority indicating message in form of priority notification message not only to inform the UE to initiate a service request procedure to obtain a service from the PN. The priority notification message from the PN also indicates that this has priority. Please note that the following observations with respect to FIG. 7 correspondingly also apply to all following drawings unless otherwise noted.

A priority notification message informing the UE about PN service priority makes the UE to listen to service related messaging (e.g. paging) from the PN with priority over service related messaging (e.g. paging) from the NPN. In this way, a UE receiving a service from the NPN may obtain service related information from the PN and may, for example, initiate a service request procedure for the service the PN wishes to provide to the UE.

In FIG. 7, the priority notification message is shown in a 5G context comprising a SNPN as NPN and Public Land Mobile Network PLMN as PN. The NPN comprises a content provider, which may provide NPN services to the UE, e.g. data services, video, audio, etc. The NPN comprises an access node, in FIG. 7 the NG-RAN+5GC.

The PN comprises a user plane function UPF, a session management function SMF, an access and mobility management function AMF and an access node NG-RAN.

It is assumed that the UE has already registered with the NPN via its access node NG-RAN+5GC and is camping there. Thus, the UE can receive services from the NPN. The UE can register with the PN via the NPN's access node NG-RAN+5GC (see step 1. in FIG. 7) and establish a PDU session (see step 2. in FIG. 7).

As indicated by step 4 of FIG. 7, the UE is receiving a NPN service delivered via the NPN access node. Therefore, it is possible that the UE does not and/or cannot listen to service related messaging from the PN (e.g. paging) indicating that a PN service is available for and/or is to be provided to the UE. In order to enable the UE to listen to service related messaging (e.g. paging from the PN), a priority notification message is used. A priority notification message may be a message from the PN to the UE the UE will receive even if being currently serviced by the NPN. In this way, the PN can "interfere" without actually interrupting the service from the NPN.

An exemplary priority notification message may be based on the NOTIFICATION message according to 3GPP document TS 24.501 version 16.4.1, table 8.2.23.1.1. This NOTI- FICATION message is sent from the network to an UE to inform the UE to initiate a service request procedure.

The following table I illustrates such an exemplary priority notification message.

TABLE I

Priority notification message

| IEI | Information Element | Type/ Reference | Presence | Format | Length |
|---|---|---|---|---|---|
| | Extended protocol discriminator | Extended protocol discriminator 9.2 | M | V | 1 |
| | Security header type | Security header type 9.3 | M | V | ½ |
| | Spare half octet | Spare half octet 9.5 | M | V | 1/2 |
| | Notification message identity | Message type 9.7 | M | V | 1 |
| | Access type | Access type 9.11.3.11 | M | V | 1/2 |
| | Spare half octet | Spare half octet 9.5 | M | V | 1/2 |
| | priority indicator (e.g. ARP) | | 0 | V | 1/2 |

The above exemplary priority notification message includes the information elements "extended protocol discriminator", "security header type", "spare half octet", "notification message identity", "access type" and "spare half octet" as known from the NOTIFICATION message of TS 24.501.

In addition, the priority notification message of table I includes a priority indicator. The priority indicator may be a parameter just indicating whether the priority notification message informs the UE that a PN service has priority or not. For such cases, the priority indicator may be set to a predefined value to indicate priority and to another predefined value to indicate that there is priority.

In further cases, the priority indicator may include an ARP (Access and Retention Priority) parameter containing information, inter alia, about a priority (or priority level). In 3GPP, ARP may indicate priority levels of 1 to 15 with the 1 the highest priority level (upwards counting levels). As illustrated in FIG. 7, the ARP may be provided by the AMF of the PN. However, the ARP priority indicator of a priority notification message of the present disclosure may have a different range of priority levels and/or use backwards counting levels.

To inform the UE about priority of a PN service, simply the fact that ARP is include in the priority notification message may indicate priority of a PN service (irrespective of a priority level indicate by ARP), while a priority notification message without ARP ("empty field") may indicate that there is no priority.

In further cases, a priority level indicated by ARP may be taken into account. In such cases, the UE may first check whether the priority level for the PN service is higher, the same or lower of a priority level for the NPN service. If the PN service priority level is higher, the UE may respond to the PN notification. If the PN service priority level is lower, the UE may not respond to the PN notification. If the PN service priority level is the same of the NPN service priority level, it may be defined whether the UE responds to the PN notification or not.

In further cases, the fact that the priority notification message includes ARP may indicate priority of a PN service over a NPN service, while a priority level indicated by ARP may be taken into account to determine whether the PN service to which the priority notification message is associated has priority of another PN service associated with another priority notification message indicating a priority level as well. This allows, on the one hand, to prioritize PN service(s) over NPN services and, on the other hand, to define (by the PN) and/or determine (by the UE), which PN service has priority over which PN service.

Having received a priority notification message actually indicating PN service priority, the UE determines that the PN service has priority over the ongoing NPN service and, then, can initiate a service request procedure with respect to the PN to obtain the PN service.

Figure 8:
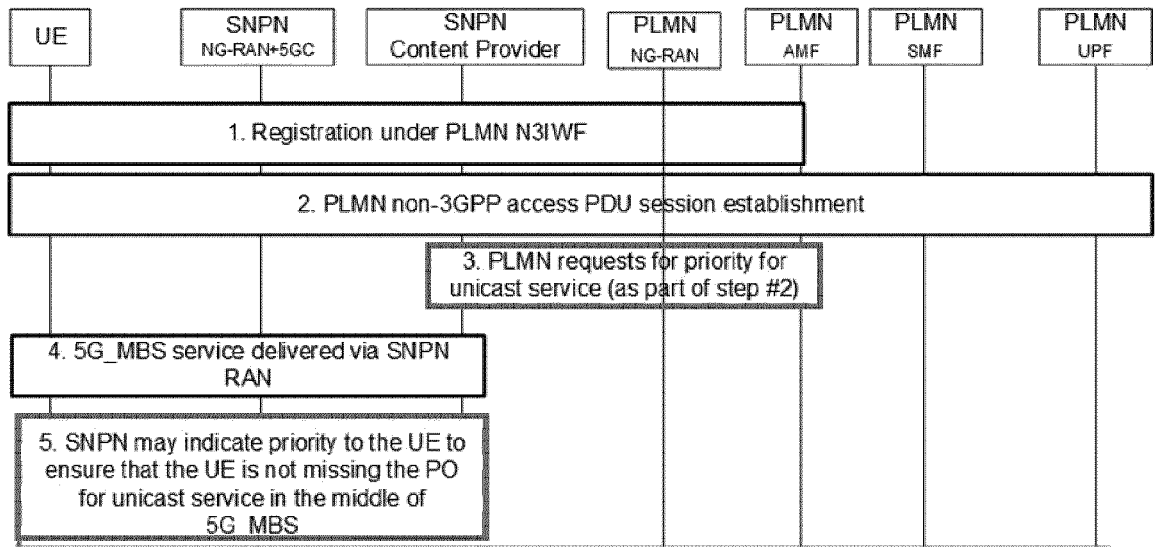
FIG. 8 illustrates a scenario using a priority request message from the PN and a priority information from the NPN according to some variations.

FIG. 8 illustrates a variation where the PN uses a priority indicating message in form of a message to the NPN requesting from the NPN priority for PN service(s).

According to FIG. 8, the PN sends a priority request message to NPN requesting informing the NPN that PN service(s) have priority over NPN services. The priority request message may be transmitted as part of step 2. This is possible since the communication between PN and UE takes place via the NPN and its access node, respectively.

As indicated by step 4 of FIG. 8, the UE is receiving a NPN service delivered via the NPN access node. In order to allow that the UE may listen to service related messaging from the PN (e.g. paging) indicating that a PN service is available for and/or is to be provided to the UE, the NPN sends a priority information to the UE informing the UE to listen to service related messaging from the PN. The priority information may be send by the NPN to the UE, e.g., just before commencing the NPN service, in parallel to the NPN service and/or interspersed with the NPN service. The priority information may be sent once or several times.

Having received the priority information from the NPN, the UE knows that is has to listen (also) to PN service related messaging from the PN while receiving the NPN service. Then, if the UE receives service related messaging from the PN service, the UE can initiate a service request procedure with respect to the PN to obtain the PN service.

Figure 9:
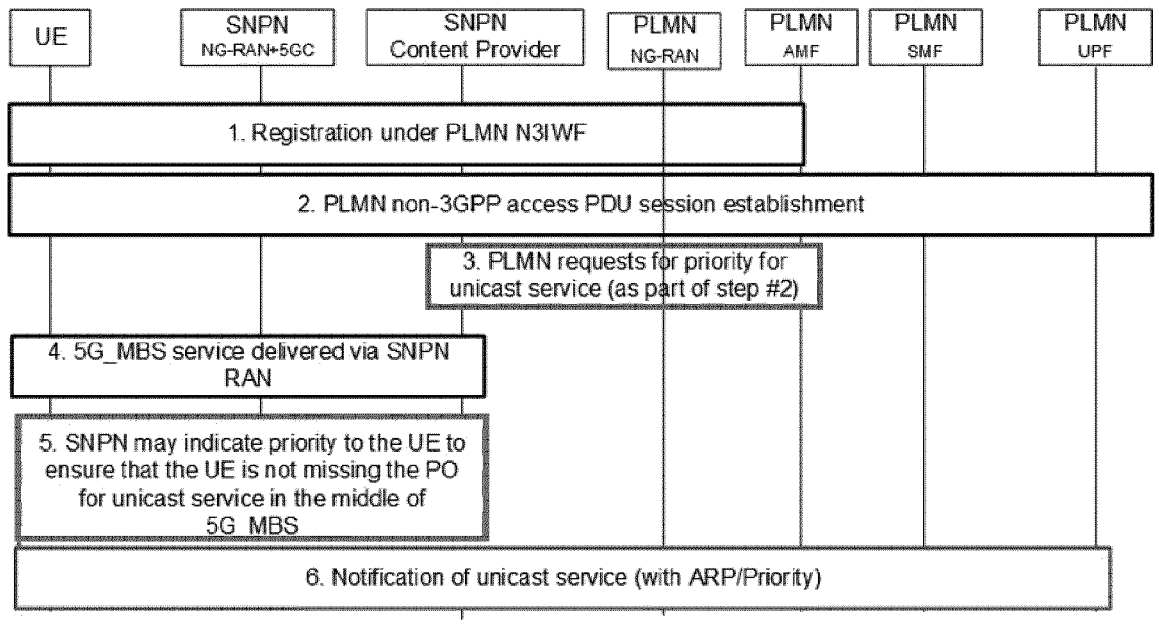
FIG. 9 illustrates a scenario combining the scenarios of FIGS. 7 and 8 according to some variations.

As illustrated in FIG. 9, the variation of FIG. 7 and the variation of FIG. 8 can be combined. This allows to inform the NPN beforehand (see step 3 of FIG. 9) that PN service(s) have priority. Further, the priority information from the NPN to the UE allows to use a priority notification message from the PN to the UE that the UE would not listen to or miss unless informed by the NPN to listen to priority notifications messages (and/or other PN service related messaging/paging from the PN).

The examples and variations of FIGS. 7 to 9 may be used in situation where PN service(s) are, e.g., not predictable, rare, not (extremely) time critical, not deterministic. In such scenarios, the PN service(s) may be irregularly "interspersed" with NPN services.

Figure 10:
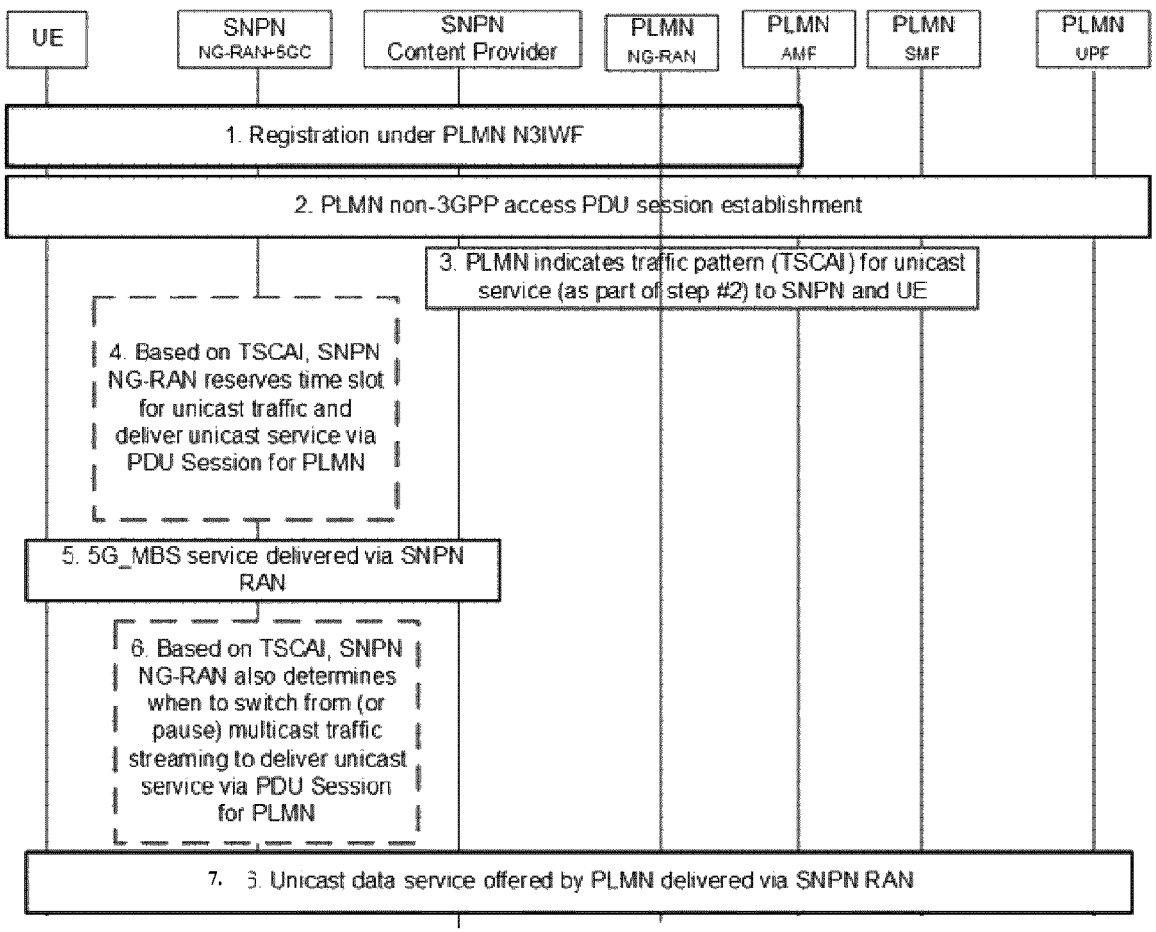
FIG. 10 illustrates a scenario using a traffic pattern indication according to some variations.

However, there may be PN services requiring (extremely) time critical deterministic data traffic towards the UE. In such scenarios, the variation of FIG. 10 may be used. As illustrated by FIG. 10, the PN sends a priority indicating message in form of a traffic pattern indication to the NPN. The traffic pattern indication may be transmitted as part of step 2.

The traffic pattern indication may be based on information concerning, for example, allowed/required latency, data rate, burst size, burst arrival time, periodicity, etc. Such information may be provide before a respective PN service commences. This allows to provide traffic information, for example, in form Time Sensitive Communication Assistance Information (TSCAI) used in 5G.

The traffic pattern indication is provided to the NPN and, particularly, its access node NG-RAN+5GC, where it is possible to plan scheduling of NPN and PN services. To this, for example, the NPN may reserve time slots for an NPN service and times slots for a PN service (see step 4 of FIG. 10). Also, the NPN may reserve resources for the NPN service and the PN service. Such reservation can be made before commencing the NPN service, but also during an ongoing NPN service. In the latter case, the scheduling for the NPN service is changed during service provision, while in the first case the scheduling for the NPN service can defined beforehand.

Then, the NPN can schedule the NPN service and the PN service according to the traffic pattern information, wherein the NPN service is provided with time slots reserved for the NPN service and the PN service is provided with time slots reserved for the PN service. This may be accomplished by the NPN and its access node, respectively, be switching from the NPN service to the PN service and back to the NPN service and so on. Step 5 of FIG. 10 illustrates the provision the NPN service following the NPN service scheduling according to the traffic pattern information. According to step 6 of FIG. 10, the NPN switches to the PN service provision when the traffic pattern information requires a change to the PN service. This allows, in step 7 of FIG. 10, the PN to provide the PN service to the UE via the PN. Then, the NPN the NPN switches back to the NPN service provision, etc.

In some examples, time slots and/or resource reserved for the PN service may remain unused by both the PN and the NPN in the case the PN does not use and/or need all time slots and/or resources reserved by the NPN.

In further examples, time slots and/or resource reserved for the PN service may remain unused by the PN in the case the PN does not use and/or need all time slots and/or resources reserved by the NPN, wherein time slots and/or resources not used by the PN may be at least partially used by the NPN. To this end, the NPN may re-allocate not used time slots and/or resource for its own usage. The NPN may determine not used time slots and/or resources, for example, by a respective information from the PN indicating that/ which time slots and/or resource are not going to be used. In alternative or additionally, the NPN may determine not used time slots and/or resources, for example, by detecting that no data is provided from the PN to the UE and/or vice versa, i.e. that time slots reserved for the PN service are "empty" and/or resources reserved for the PN service are not allocated by the PN.

Assume that the NPN service is provided in multicast mode and the PN service is provided in unicast mode, then, the NPN may, according to the traffic information from the public network, switch from its multicast mode for providing the NPN service to a unicast mode for providing the PN service.

Assume that the NPN service is provided in unicast mode and the PN service is provided in multicast mode, then, the NPN may, according to the traffic information from the public network, switch from its unicast mode for providing the NPN service to a multicast mode for providing the PN service.

Assume that the NPN service and the PN service are provided in multicast mode, then no switching with respect to multicast/unicast may take place.

Assume that the NPN service and the PN service are provided in unicast mode, then no switching with respect to unicast/multicast may take place.

Figure 11:
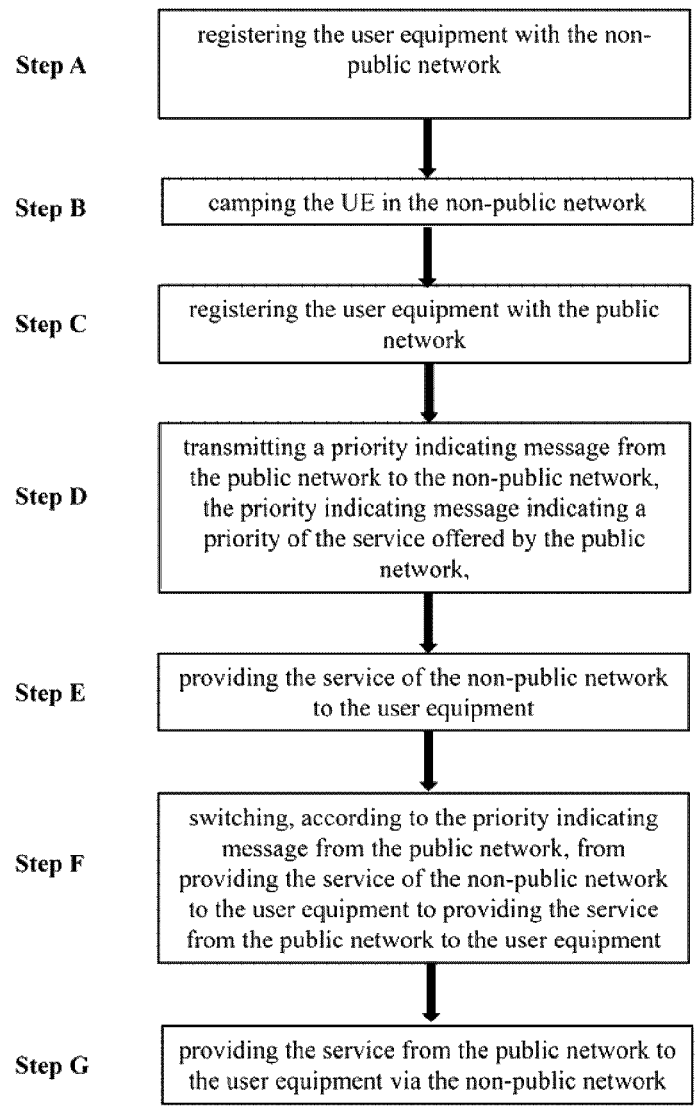
FIG. 11 illustrates a flow chart of a method of providing concurrent services from a public network and a non-public network for a user equipment according to some variations.

FIG. 11 shows an exemplary flow chart of a method of providing concurrent services from a public network and a non-public network for a user equipment, where the UE first receive a service from the non-public network and, then, the public network provides a service of the public network to the UE. In step A, a user equipment registers with the non-public network. In step B, the user equipment is camping in the non-public network. In step C, user equipment registers with the public network. In step D, the public network transmits a priority indicating message to the non-public network, the priority indicating message indicating a priority of the service offered by the public network. In step E, the non-public network provides the service of the non-public network to the user equipment. In step F, it is switched, according to the priority indicating message from the public network, from providing the service of the non-public network to the user equipment to providing the service from the public network to the user equipment. In step G, the service from the public network is provided to the user equipment via the non-public network.

Figure 12:
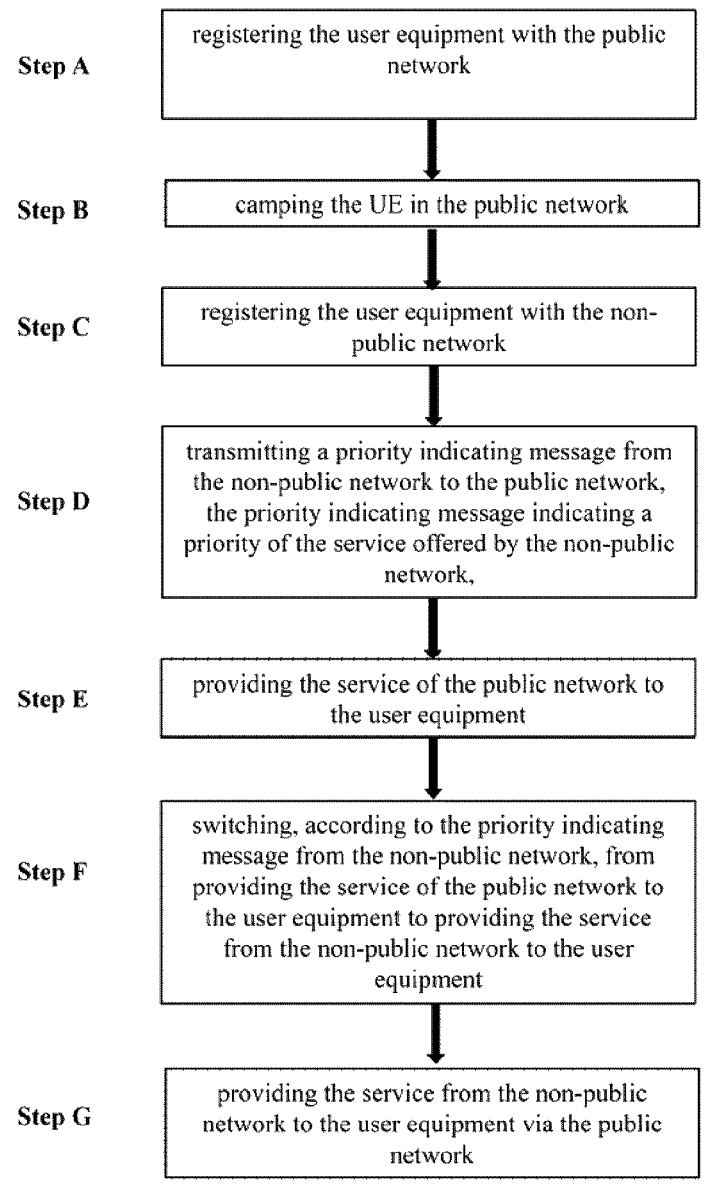
FIG. 12 illustrates a flow chart of a method of providing concurrent services from a non-public network and a public network for a user equipment according to some variations.

FIG. 12 shows an exemplary flow chart of a method of providing concurrent services from a public network and a non-public network for a user equipment, where the UE first receive a service from the public network and, then, the non-public network provides a service of the non-public network to the UE. In step A, a user equipment registers with the public network. In step B, the user equipment is camping in the public network. In step C, user equipment registers with the non-public network. In step D, the non-public network transmits a priority indicating message to the public network, the priority indicating message indicating a priority of the service offered by the non-public network. In step E, the public network provides the service of the public network to the user equipment. In step F, it is switched, according to the priority indicating message from the non-public network, from providing the service of the public network to the user equipment to providing the service from the non-public network to the user equipment. In step G, the service from the non-public network is provided to the user equipment via the public network.

When switching to the PN service provision, the NPN may pause the NPN service so that the UE does not miss a part of the NPN service. In other cases, the NPN may buffer the NPN service as long as the PN service is provided. This allows to provide the service to other UEs not receiving the PN service and to avoid that the UE receiving the PN service misses a part of the NPN service.

The subject-matter described herein may be embodied in systems, apparatus, methods, and/or articles depending on the desired configuration. For example, the user equipment (or one or more components therein) and/or the processes described herein can be implemented using one or more of the following: a processor executing program code, an application-specific integrated circuit (ASIC), a digital signal processor (DSP), an embedded processor, a field programmable gate array (FPGA), and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "computer-readable medium" refers to any computer program product, machine-readable medium, computer-readable storage medium, apparatus and/or device (for example, magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. Moreover, the implementations described above may be directed to various combinations and sub-combinations of the disclosed features and/or combinations and sub-combinations of several further features disclosed above. Other variations may be within the scope of the following claims.

If desired, the different functions discussed herein may be performed in a different order and/or concurrently with each other. Furthermore, if desired, one or more of the above-described functions may be optional or may be combined. Although various aspects of some of the embodiments are set out in the independent claims, other aspects of some of the embodiments comprise other combinations of features from the described embodiments and/or the dependent claims with the features of the independent claims, and not solely the combinations explicitly set out in the claims. It is also noted herein that while the above describes example variations and examples, these descriptions should not be viewed in a limiting sense. Rather, there are several variations and modifications that may be made without departing from the scope of some of the embodiments as defined in the appended claims. Other variations may be within the scope of the following claims.

The invention claimed is:

1. A method of providing concurrent services from a first network and a second network for a user equipment, the method comprising: registering the user equipment with the second network, wherein the second network is a non-public network; camping the user equipment in the second network; registering the user equipment with the first network, wherein the first network is a public network; transmitting a priority indicating message from the first network to the second network, the priority indicating message indicating a priority of a first service offered by the first network, wherein the priority indicating message comprises: a priority notification message from the first network to the user equipment via the second network, the priority notification message comprising a priority indicator and indicating a priority of the first service offered by the first network and prompting the user equipment to initiate a service request procedure with the first network; a priority request message from the first network to the second network, the priority request message requesting priority for the first service of the first network over a second service of the second network, wherein the second network informs the user equipment to prioritize messages from the first network; and a traffic pattern indication from the first network to the second network, the traffic pattern indication comprising information about an expected traffic pattern of the first service of the first network; providing the second service of the second network to the user equipment, wherein: the second network reserves, according to traffic pattern information provided by the first network, resources including at least one time slot for the service of the second network and resources including at least one time slot for the service of the first network, the traffic pattern information comprising allowed and required latency, data rate, burst size, burst arrival time, and periodicity, the second service of the second network is provided during the at least one time slot reserved for the second service of the second network, and the first service of the first network is provided during the at least one time slot reserved for the first service of the first network; switching, according to the priority indicating message from the first network, from providing the second service of the second network to the user equipment to providing the first service from the first network to the user equipment; and providing the first service from the first network to the user equipment via the second network.

2. The method according to claim 1, wherein:
the second network switches, according to the traffic pattern provided by the first network,
(A) from multicast for providing the second service of the second network to unicast for providing the first service of the first network, or
(B) from unicast for providing the second service of the second network to multicast for providing the first service of the first network.

3. The method according to claim 1, further comprising: pausing the provision of the second service of the second network according to the traffic pattern during provision of the first service of the first network, and buffering the second service of the second network according to the traffic pattern during provision of the first service of the first network.

4. A user equipment configured to obtain a first service from a first network and a second service from a second network, the user equipment comprising: at least one processor; and at least one memory including computer program code; the at least one memory and the computer program code being configured to, with the at least one processor, cause the user equipment at least to: register with the second network, wherein the second network is a public network, camp in the second network, register with the first network, wherein the first network is a non-public network, obtain the service of the second network, wherein: the second network reserves, according to traffic pattern information provided by the first network, resources including at least one time slot for the service of the second network and resources including at least one time slot for the service of the first network, the traffic pattern information comprising allowed and required latency, data rate, burst size, burst arrival time, and periodicity, the second service of the second network is provided during the at least one time slot reserved for the second service of the second network, and the first service of the first network is provided during the at least one time slot reserved for the first service of the first network; and switch, according to a priority indicating message from the first network, from obtaining the second service of the second network to obtaining the first service of the first network, the priority indicating message indicating a priority of the first service offered by the first network over the second service of the second network, wherein: the priority indication message comprises a priority notification message to the user equipment, wherein the priority notification message is delivered, upon initiation by first network, via second network, the priority notification message instructing the user equipment to listen to service related messaging information from the first network during provision of the service from the second network; in response to the priority notification message from the first network indicating that the service from the first network is to be provided, switch to receive the service from the first network; the priority notification message indicates that the service of the first network has priority over the service from the second network; and the priority indicating message from the first network indicates a traffic pattern according to which the service of the first network is provided.

5. The user equipment according to claim 4, wherein the at least one memory and the computer program code are configured to, with the at least one processor, cause the user equipment at least to:

register with the second network via an access node of the second network; and register with the first network via the access node of the second network and the second network, wherein the first service of the first network is provided via the second network.

6. The user equipment according to claim 5, wherein the priority indicating message from first network comprises a priority request message to the second network to grant priority for service from the public-network.

7. The user equipment according to claim 6, wherein the second network transmits is configured to transmit priority information to the user equipment to indicate towards the user equipment that service related messaging from the first network has priority.

8. The user equipment according to claim 7, wherein the notification message from the first network includes allocation and retention priority information.

9. The user equipment according to claim 8, wherein the at least one memory and the computer program code are configured to, with the at least one processor, cause the user equipment at least to:

obtain the second service of the second network during at least one time slot previously reserved by the second network, according to the traffic pattern, for the second service of the second network; and obtain the first service of the first network during at least one time slot previously reserved by the second network, according to the traffic pattern, for the first service of the first network.

* * * * *